United States Patent
Eonnet

(10) Patent No.: US 7,509,119 B2
(45) Date of Patent: Mar. 24, 2009

(54) AUTHENTICATION METHOD AND DEVICE IN A TELECOMMUNICATION NETWORK USING A PORTABLE DEVICE

(75) Inventor: Yves Eonnet, Saint Nom la Breteche (FR)

(73) Assignee: Tagattitude, Rocquencourt (FR)

( * ) Notice: Subject to any disclaimer, the term of this patent is extended or adjusted under 35 U.S.C. 154(b) by 243 days.

(21) Appl. No.: 10/576,806

(22) PCT Filed: Oct. 21, 2004

(86) PCT No.: PCT/FR2004/002694

§ 371 (c)(1),
(2), (4) Date: Apr. 21, 2006

(87) PCT Pub. No.: WO2005/041473

PCT Pub. Date: May 6, 2005

(65) Prior Publication Data

US 2007/0190975 A1    Aug. 16, 2007

(30) Foreign Application Priority Data

Oct. 21, 2003  (FR) ................................ 0312284

(51) Int. Cl.
    H04M 1/66      (2006.01)
(52) U.S. Cl. ............................ 455/411; 713/169; 726/4
(58) Field of Classification Search ................. 455/411; 726/27; 713/170, 155; 379/93.04
    See application file for complete search history.

(56) References Cited

U.S. PATENT DOCUMENTS

| 6,049,712 | A  | * | 4/2000 | Wallinder ............... 455/410 |
| 6,289,223 | B1 | * | 9/2001 | Mukherjee et al. .......... 455/466 |
| 6,782,080 | B2 | * | 8/2004 | Leivo et al. .............. 379/93.04 |
| 6,889,325 | B1 | * | 5/2005 | Sipman et al. .............. 713/176 |
| 7,231,025 | B2 | * | 6/2007 | Labaton ..................... 379/188 |
| 2003/0041245 | A1 | * | 2/2003 | Chan et al. .................. 713/176 |
| 2003/0159068 | A1 |   | 8/2003 | Halpin et al. |
| 2003/0172272 | A1 | * | 9/2003 | Ehlers et al. ................ 713/170 |
| 2004/0132432 | A1 | * | 7/2004 | Moores et al. .............. 455/413 |

FOREIGN PATENT DOCUMENTS

| EP | 0 996 300 A | 4/2000 |
| EP | 1 280 368 A | 1/2003 |

* cited by examiner

*Primary Examiner*—Rafael Pérez-Gutiérrez
*Assistant Examiner*—Marcos Batista
(74) *Attorney, Agent, or Firm*—Cohen Pontani Lieberman & Pavane LLP

(57) ABSTRACT

A method of authenticating the user (U) of a terminal (2) connected to an Internet type network. A communications channel is set up in a secure mobile telephony network (GSM) between mobile equipment (3) of the user (U) situated close to the terminal (2) and an authentication unit (1). The terminal (2) downloads (E30) an auto-run digital code from the authentication unit (1). The mobile equipment sends (E40) a sound signal via the mobile communications channel to the authentication unit (1), the sound signal being generated (E35) by the terminal (2) on the basis of the digital code. The user (U) is authenticated on the basis of the sound signal received (E40) via the mobile communications channel (GSM), and on the basis of an identifier (GSM_No) of the mobile equipment (3).

16 Claims, 2 Drawing Sheets

AUTHENTICATION METHOD AND DEVICE IN A TELECOMMUNICATION NETWORK USING A PORTABLE DEVICE

RELATED APPLICATIONS

This is a U.S. National Stage of International Application No. PCT/FR2004/002694, filed on 12 Oct. 2004.

FIELD OF THE INVENTION

The present invention relates to an authentication method and system in a telecommunications network.

More precisely, the present invention makes it possible, in non-limiting manner, to authenticate a user desiring to access the internal network of a business from a remote terminal.

BACKGROUND OF THE INVENTION

For this purpose, several authentication systems are already known, in particular the system based on a "log-in password" in which the person seeking to be authenticated is invited to key in an identifier (name, forename, ... ) together with a secret code.

That technique is cumbersome to manage and is known to be highly fragile from a security point of view. People in charge of security systems recommend changing password every month, using a password constituted by an alphanumeric string that does not represent a known or familiar word, and not writing the password down. Very few people comply with those instructions, and thus the method is insecure.

Authentication systems are also known that are based on a public key infrastructure (PKI). Such solutions make use of mathematical relationships based on prime numbers and provide security that is very robust.

Nevertheless they present the drawback of requiring cumbersome organization (directory, certificate generation, proprietary software mechanisms) and they are based on using a module of the smart card type for secure storage of the secret key. Such solutions are generally expensive and difficult to deploy.

Biometric techniques provide an alternative solution to authentication that is robust but expensive and that raises problems in terms of ergonomics and deployment.

Finally, there exist several marginal solutions that are based on possessing a personal and unique module that the user puts into operation for authentication purposes, the module then generating a code that is recognized by the server of the business.

Those solutions are based on using a personal electronic module that generates a code that the user must key in for authentication purposes.

Those solutions suffer from the drawback of being both expensive (in terms of hardware and licenses) and of requiring the possession of a specific module, since otherwise it is not possible to be authenticated.

SUMMARY OF THE INVENTION

The invention enables the above drawbacks to be mitigated by proposing an authentication method and system that are particularly simple to implement.

To this end, one aspect of the present invention is directed to a method of authenticating the user of a terminal connected to an Internet type network. The method comprises the following steps:

setting up a communications channel in a secure mobile telephony network between mobile equipment of said user situated close to the terminal and an authentication unit connected to said Internet type network;

the terminal downloading via said Internet type network a digital code from said authentication unit;

said mobile equipment sending a sound signal via said mobile communications channel to said authentication unit, the sound signal being generated by the terminal on the basis of said digital code; and authenticating said user on the basis:
of the sound signal received via said mobile communications channel; and
of an identifier of said mobile equipment.

This authentication method is thus particularly easy to use since it suffices for the user to set up a mobile telephone call with the authentication unit, and to place the mobile telephone equipment close to the terminal in order to be authenticated.

The authentication method of the invention relies firstly on the security of the secure mobile telephone network, and secondly on the fact that the mobile equipment is personal to the user.

When the authentication unit receives the sound signal via the mobile communications channel, it thus checks that the signal was transmitted from the personal mobile equipment of a user who is necessarily situated close to the terminal that received the digital code.

After performing this verification, the authentication unit can, for example, transmit the telephone number of said mobile equipment to the server of a business that then authorizes or refuses access to the proprietor of the mobile equipment.

Preferably, the identifier used by the authentication unit is the telephone number of the user's mobile telephone.

Thus, the authentication method of the invention makes it possible to authorize or refuse a user access to a business server merely on the basis of knowing the user's mobile telephone number.

When the secure mobile telephone network uses the GSM standard, the so-called IMEI identifier of the mobile equipment may also be used, as can any other unique identifier.

Preferably, the authentication method of the invention includes a step of using the above-specified digital code to create a digital audio file suitable for running automatically on the terminal in order to generate the sound signal.

By way of example, the digital audio file may be a file in the .WAV format or in the .MP3 format.

This characteristic advantageously makes it possible to further simplify the authentication method of the invention, since it suffices on use to place the mobile equipment close to a loudspeaker of the terminal in order to transmit to the authentication unit the sound signal generated from the digital code.

In a preferred embodiment, the authentication unit samples the received sound signal and compares the result of the sampling with a copy of the digital code stored by the authentication unit.

In a preferred embodiment of the invention, the sound signal used is a sequence of dual tone multifrequency (DTMF) codes.

To this end, the digital code may be constituted by a sequence of digits, the authentication unit being adapted to create a digital audio file that is adapted to generate automatically a sound phrase corresponding to said sequence of DTMF codes.

When the digital audio file is received by the terminal, it is executed automatically in order to emit the above-mentioned sound phrase, the sound phrase being generated by a loudspeaker of the terminal and sent via the communications channel of the secure mobile telephone network to the authentication unit which can verify, e.g. by sampling, that the sound signal received via the GSM network does indeed corresponding to the original sequence of DTMF codes.

In a preferred embodiment, the authentication unit generates the digital code randomly prior to the code being downloaded by the terminal.

The digital code is then destroyed either on expiry of a predetermined time delay, typically of the order of a few seconds, or else after authentication proper has taken place.

Thus, when the authentication unit receives the sound signal from the mobile equipment, it verifies whether the sound signal corresponds to the digital code used for creating the digital audio file that was sent to the terminal.

The digital code is preferably destroyed after verification or after a predetermined time period.

This characteristic makes it possible to reinforce the security of the authentication method of the invention considerably, since even if the sound signal were to be recorded fraudulently, the recording would be of no effect once the above-mentioned predetermined time period has expired.

In a preferred implementation, the authentication method of the invention includes, after the authentication step, a step whereby the authentication unit sends a short message service (SMS) message to the mobile equipment, the SMS containing the date and the result of the authentication step.

Thus, the proprietor of the mobile equipment receives an SMS after each attempt at authentication, whether or not the attempt is successful.

Another aspect of the present invention is directed to an authentication system connected to an Internet type network. The system comprises:
- means for establishing a communications channel with mobile equipment via a secure mobile telephone network;
- send means for sending a digital code to a terminal connected to said Internet type network;
- receive means for receiving via said mobile communications channel a sound signal from said mobile equipment, the sound signal being generated by the terminal on the basis of said digital code; and
- authentication means for authenticating the user of said mobile equipment as a function:
  - of said sound signal received via said mobile communications channel; and
  - of an identifier of said mobile equipment.

The particular advantages of the authentication system are identical to those of the above-described method, so they are not repeated here.

BRIEF DESCRIPTION OF THE DRAWINGS

Other aspects and advantages of the present invention appear more clearly on reading the following description of a particular embodiment, the description being given purely by way of non-limiting example and being made with reference to the accompanying drawings, in which.

DETAILED DESCRIPTION OF THE DRAWINGS

Figure 1:
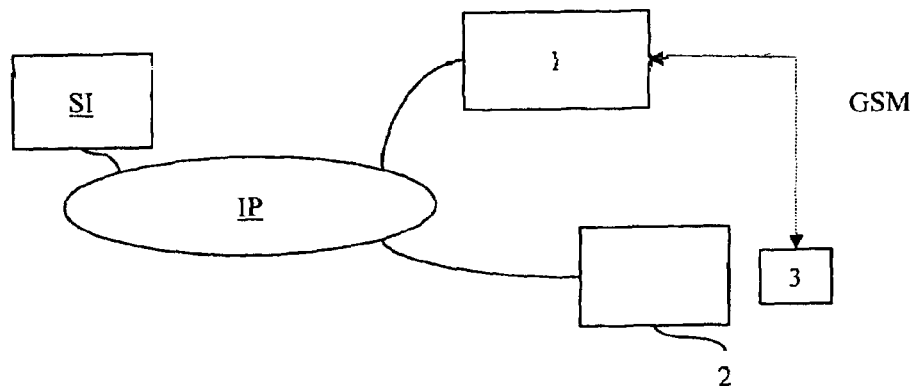
FIG. 1 shows an authentication system in accordance with the invention in a preferred example of a utilization scenario.

FIG. 1 shows an authentication system in a preferred scenario for implementing the invention.

It is assumed below that the authentication system is used to authenticate a user seeking access to a server SI from a remote terminal 2 (e.g. a PC type personal computer).

It is also assumed that the user U of the remote terminal 2 possesses mobile equipment 3. In the example described herein, the mobile equipment is a cell phone complying with the GSM standard and having the number GSM_No.

In the utilization scenario described below, when the user U connects to the server SI from the terminal 2, e.g. by keying the address of the server SI into a hypertext markup language (HTML) browser known to the person skilled in the art, the user is rerouted to an authentication unit 1 of an authentication system in accordance with the invention, and receives on the screen of the terminal 2 a home page 50 coming from the authentication unit 1.

The home page 50 carries a message inviting the user U to dial the GSM telephone number of the authentication unit 1.

By dialing this number on the mobile equipment 3, the user sets up a secure mobile communications channel in conventional manner with the authentication unit 1.

In accordance with the invention, the authentication unit 1 is adapted to obtain the number GSM_NO of the mobile equipment 3 that is situated close to the remote terminal 2 by verifying that a sound signal received from said mobile equipment 3 was generated by the terminal 2 on the basis of a digital audio file, itself created by the authentication unit 1.

Once it has been obtained by the authentication unit 1, the telephone number GSM_No is transmitted to the server SI which, where appropriate, authenticates the user of the mobile equipment 3 and authorizes access to the server SI.

Figure 2:
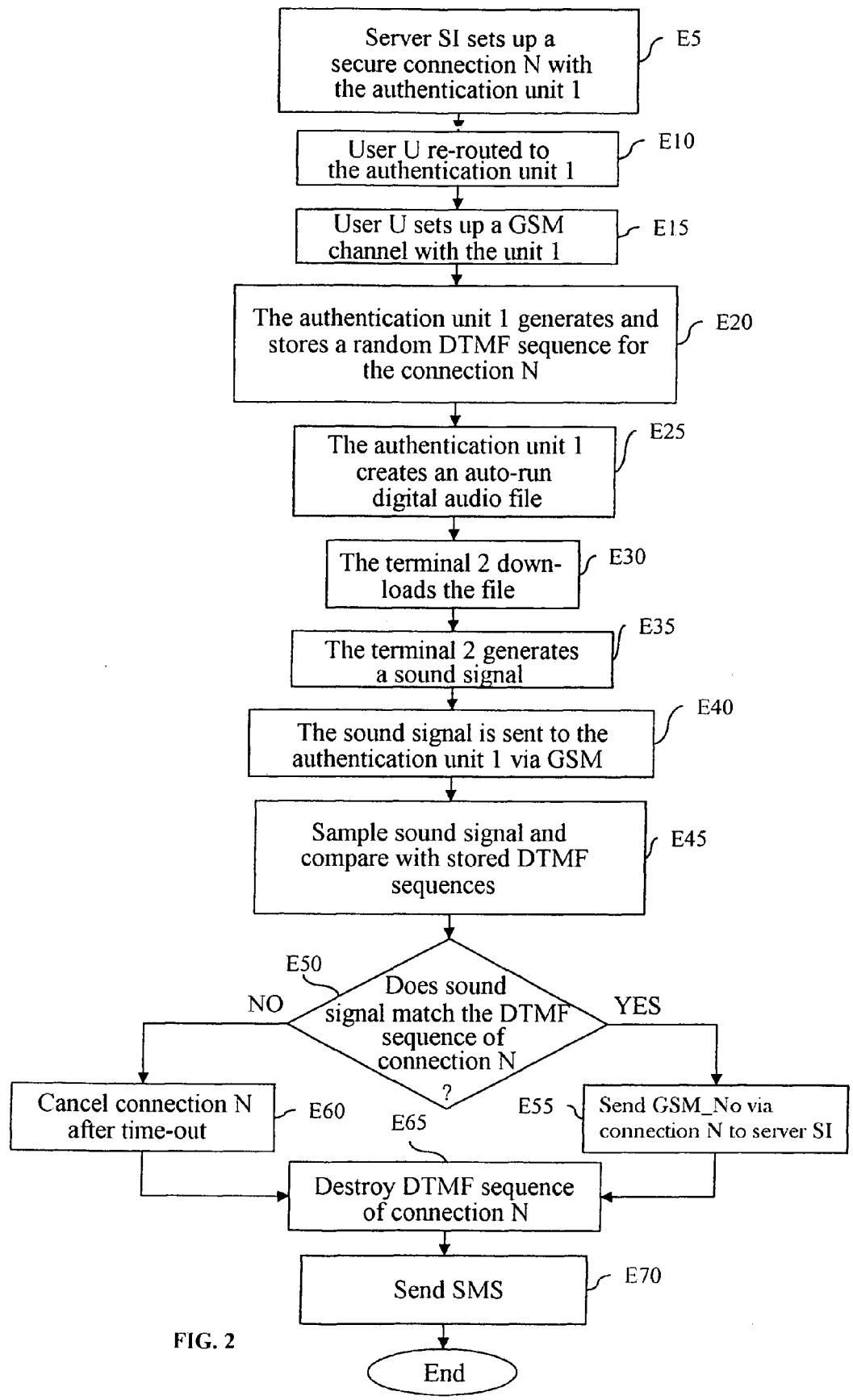
FIG. 2 shows the main steps of an authentication method of the invention in a preferred implementation.

FIG. 2 shows the main steps E5 to E70 of an authentication method in accordance with the invention in a preferred implementation.

In the implementation described below, when the user U seeks to access a server SI from a remote terminal 2, the server SI acts during a first step E5 to generate a secure connection number N, this number uniquely identifying the connection between the remote terminal 2 and the server SI.

During this first step E5, the server SI sets up a secure call with an authentication unit 1 in accordance with the invention and communicates the secure connection identifier N to the authentication unit 1.

During a following step E10, the user U is automatically rerouted to a home page 50 of the authentication unit 1.

This home page includes a GSM telephone number that is displayed on the screen of the remote terminal 2.

According to the invention, this GSM telephone number corresponds to a telephone number of the authentication unit 1.

Thus, the user U seeking to be authenticated dials the above-mentioned GSM telephone number during a step E15 using the mobile equipment 3, thereby setting up a secure mobile communications channel with the authentication unit 1.

This calling step E15 is followed by a step E20 during which the authentication unit 1 randomly generates a digital code. In the example described below, this digital code is a sequence of DTMF codes, e.g. the sequence 8, 4, 3, 2, 1, 2, 4.

During this step E20, the authentication unit 1 associates this digital code with the unique connection identifier N, e.g. in a file 40.

The step E20 of generating and storing the DTMF code sequence is followed by a step E25 during which the authentication unit 1 creates an auto-run digital audio file from the digital code generated during step E20.

In the preferred embodiment described below, the digital audio file is in the .WAV format.

Thus, in the example described, a .WAV format digital audio file is created during the step E25, and when the file is executed it serves to generate the DTMF codes 8, 4, 3, 2, 1, 2, 4 one after another.

Once the digital audio file has been created, the authentication unit 1 sends a message to the user U of the mobile equipment 3 via the secure GSM channel set up in step E10, inviting the user to click on a zone of the home page 50 as displayed on the remote terminal 2, and preferably to click on an icon.

When the user clicks on said zone, that causes the above-mentioned .WAV format digital audio file to be downloaded by the terminal 2 (step E30).

The downloading step E30 is followed by a step E35 during which the auto-run file runs automatically on the terminal 2, thereby generating a sound signal, and specifically the random DTMF sequence 8, 4, 3, 2, 1, 2, 4 as generated beforehand during the generation step E20.

Providing the user U brings the microphone of the mobile equipment 3 close enough to the loudspeaker of the terminal 2, the DTMF code sequence issued by the loudspeaker of the terminal 2 is sent during a send step E40 to the authentication unit 1 via the secure GSM channel as opened during step E15.

During this step, the sound signal is thus received by the authentication unit 1.

The sound signal is then sampled during the following step E45 and compared with the set of digital codes (i.e. in this case the DTMF sequences ("8732124", "6009")) stored in the file 40 of the authentication unit 1.

This comparison step is known to the person skilled in the art. It is used in particular in voice servers for identifying a DTMF code keyed in to a telephone calling the voice server.

The sampling and comparison step E45 is followed by an identification test E50 which gives a positive result if the sound signal as received and sampled during step E50 is identical to the digital code (8732124) stored in the file 40 and associated with the secure connection identifier N.

Under such circumstances, the test E50 is followed by a step E55 during which the authentication unit 1 sends the number GSM_No of the mobile equipment 3 to the server SI via the secure connection N.

Otherwise, if no sound signal corresponding to the DTMF sequence associated with the secure connection N is received within a predetermined time period, then the result of the identification test E50 is negative and the authentication unit 1 transmits information representative of authentication failure to the server SI via the secure connection having the identifier N.

In any event, the steps E55 and E60 of sending an identification result to the server SI are followed by a step E65 in which the DTMF sequence generated during step E20 is destroyed.

This destruction step E65 serves to ensure that the random digital code generated during step E20 is not reused, thereby reinforcing the security of the authentication method of the invention.

The digital code is preferably also destroyed at the end of a predetermined time period measured from generation thereof (in step E20).

The destruction step E65 is followed by a step E70 during which the authentication unit 1 sends an SMS to the mobile equipment 3, the SMS comprising the date and the result of the above-described comparison step E45.

This notification step E70 terminates the authentication method in the implementation described herein.

Figure 3:
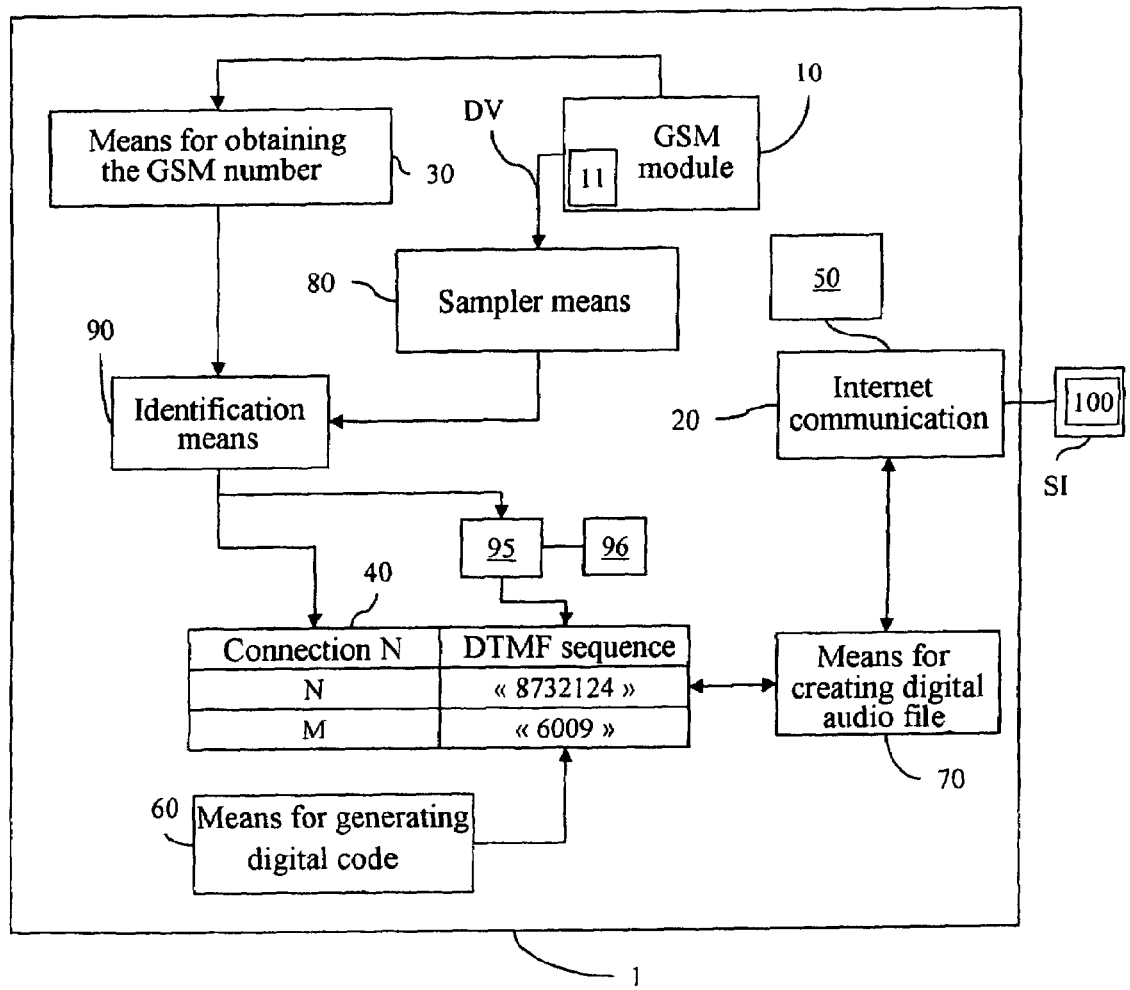
FIG. 3 is a more detailed block diagram of authentication system of the invention in a preferred embodiment.

FIG. 3 shows an authentication system 1 in accordance with the invention in a preferred embodiment.

The authentication system mainly comprises an authentication unit 1.

The authentication unit 1 comprises a module 10 suitable for receiving a call in compliance with the GSM standard, referred-to herein as the GSM module 10. The GSM module 10 enables the authentication unit 1 to set up a secure mobile call channel with the mobile equipment 3.

In another embodiment, the GSM module could be replaced by a communications module complying with some other secure mobile telephony standard, for example complying with the universal mobile telephone system (UMTS) protocol that makes use of code division multiple access (CDMA).

The authentication unit 1 also comprises an Internet communications module 20. This Internet communications module 20 comprises more precisely hardware and software means for communicating with other equipment in the Internet, and in particular a network card and software means for implementing a communications protocol of the transmission control protocol/Internet protocol (TCP/IP) type.

In the embodiment described herein, when a user U accesses the server SI from a terminal 2, the user is rerouted to a home page 50 hosted by the authentication unit 1, which home page 50 includes a message inviting the user U of the terminal 2 to use a GSM mobile telephone 3 to call the GSM module 10 of the authentication unit 1.

The authentication unit 1 also comprises means 30 adapted to respond to a GSM frame received by the GSM module 10 to obtain the telephone number of any mobile equipment 3 with which it is in communication.

Thus, when the user U calls the GSM module of the authentication server 10, the means 30 obtain the number GSM_No of the GSM mobile telephone 3.

The authentication unit 1 described herein also includes a file 40 in which:
- a first column contains the identifiers N, M of secure connections established between servers SI using an authentication method in accordance with the invention and the authentication unit 1; and
- a second column containing the digital codes (i.e. in this example DTMF codes) associated with the above-mentioned identifiers N, M.

For this purpose, the authentication unit 1 has means for generating a random digital code (in this case a DTMF code sequence) and for storing the random digital code in the last column of the file 40.

The means 60 for generating a DTMF sequence in the authentication unit 1 are conventional and are not described herein.

It is assumed in the example described that following the call from the mobile equipment 3, the generator means 60 generate and store the DTMF sequence 8, 7, 3, 2, 1, 2, 4 in the second column of the file 40 in association with the identifier N of the secure connection established between the server SI and the authentication unit 1.

The authentication unit 1 also has means 70 for sequence.

Thus, in the example described herein, the file creation means 70 are adapted to create a .WAV format digital audio file which, when it runs, generates the DTMF sequence 8, 7, 3, 2, 1, 2, 4.

When the user of the terminal 2 clicks on a predetermined zone of the home page 50, the Internet communications means 20 enable the above-mentioned .WAV digital audio file to be downloaded by the remote terminal 2.

As described above, the remote terminal 2, on receiving the file, automatically emits the DTMF sequence 8, 7, 3, 2, 1, 2, 4 through its loudspeaker.

Since the mobile equipment 3 of the user of the terminal 2 is situated close to the loudspeaker, the DTMF code 8, 7, 3, 2, 1, 2, 4 is sent over the previously-established secure GSM channel to the GSM module 10 of the authentication unit 1.

This voice data DV is transmitted by the GSM module 10 to sampler means 80 in the authentication unit 1.

These sampler means 80 are more particularly adapted to recognize in the voice data DV received by the GSM module 10, those frequencies that are characteristic of DTMF codes.

Thus, if the DTMF code sequence "8732124" is received by the GSM module 10, then the sampler means 80 are adapted to output in succession the following sequence of digits: 8, 7, 3, 2, 1, 2, and 4.

The digits are delivered by the sampler means 80 to identification means 90 that are adapted, where appropriate, to determine the secure connection identifier N, M stored in the first column of the file 40 in register with the DTMF sequence supplied by the sampler means 80.

Under such circumstances, the identification means 90 send to the server SI the number GSM_No of the mobile equipment 30 that sent the DTMF sequence "87321241" to the authentication unit 1, where said number is obtained by the means 30.

On receiving the number GSM_No, the server SI is suitable for using the authentication means 100 to determine whether the user U of the remote terminal 2 is known as being the proprietor of the mobile equipment 3.

In practice, the authentication means 100 check in a database (not shown) of the server SI whether the proprietor of mobile equipment 3 is or is not authorized to access the server SI.

The authentication means 90 are also adapted to send information to the server SI over the secure connection N, which information is representative of a failure of authentication in the event of the sound signal not being received or in the event of it not corresponding to the DTMF sequence associated with the identifier N for the secure connection.

Furthermore, the GSM module 10 of the authentication unit 1 has means 11 for sending an SMS to the mobile equipment 3. Such means for sending an SMS are known and are not described herein.

They are adapted in particular to send an SMS comprising the date and the result of the comparison step E45 performed by the identification means 90, as described above.

The authentication unit 1 described herein also includes means 95 for destroying the DTMF sequence stored in the file 40.

These destruction means 95 are adapted in particular to destroy the above-mentioned DTMF code sequence after a predetermined time period measured from the generation of the DTMF sequence by the DTMF generator means 60.

For this purpose, the destruction means 95 co-operate with a clock 96.

The destruction means 95 are also adapted to destroy from the identification means 90, in particular when said means have terminated the above-described identification test E50.

The description above with reference to FIGS. 1 to 3 relates to preferred implementations and embodiments of the authentication method and system of the invention in which the digital code used for authentication purposes is a DTMF sequence.

Naturally, other digital codes could also be used, and in particular inaudible signatures that can be hidden in music or an audio message using the so-called "watermarking" technique.

In any event, these various methods serve to verify in certain manner that a sound signal received over a secure mobile communications channel was obtained from a digital code stored by the authentication system of the invention.

The invention claimed is:

1. A method of authenticating the user of a terminal connected to an Internet network, wherein the method comprises the steps of:
    setting up a communications channel in a secure mobile telephony network between mobile equipment of said user situated close to the terminal and an authentication unit connected to said Internet network;
    the terminal downloading via said Internet network a digital code from said authentication unit;
    said mobile equipment sending a sound signal to said authentication unit, the sound signal being generated by the terminal on the basis of said downloaded digital code; and
    authenticating said user on the basis of the sound signal received by the authentication unit via said mobile communications channel and of an identifier of said mobile equipment.

2. The authentication method according to claim 1, wherein said mobile equipment is a mobile telephone and said identifier of said mobile equipment is its telephone number.

3. The authentication method according to claim 1, wherein said mobile equipment complies with the GSM standard, and said identifier of said mobile equipment is its IMEI code.

4. The authentication method according to claim 1, further comprising the step of creating a digital audio file (.WAV) from said digital code, said digital audio file being adapted to run automatically on the terminal in order to generate said sound signal.

5. The authentication method according to claim 1, wherein in order to proceed with said authentication, said authentication unit:
    samples the received sound signal; and
    compares the result of said sampling with a copy of said digital code stored by said authentication unit.

6. The authentication method according to claim 5, wherein after said authentication the method further comprises:
    sending, by the authentication unit, an SMS to said mobile equipment, said SMS comprising the date and the result of said comparison step.

7. The authentication method according to claim 1, wherein said sound signal is a DTMF code sequence.

8. The authentication method according to claim 1, further comprising:
    randomly generating said digital code prior to said downloading step; and
    destroying said digital code after said authentication step or after a predetermined time period.

9. An authentication system connected to an Internet network, wherein the system comprises:

means for establishing a communications channel with mobile equipment via a secure mobile telephone network;

send means for sending a digital code to a terminal connected to said Internet network;

receive means for receiving via said mobile communications channel a sound signal from said mobile equipment, the sound signal being generated by the terminal on the basis of said sent digital code; and authentication means for authenticating a user of said mobile equipment as a function:
of said sound signal received via said mobile communications channel; and of an identifier of said mobile equipment.

10. The authentication system according to claim 9, wherein said mobile equipment is a mobile telephone and said authentication means take account of the identifier of said mobile equipment as constituted by its telephone number.

11. The authentication system according to claim 9, wherein said mobile equipment complies with the GSM standard, and said authentication means are adapted to authorize or refuse access by taking account of the identifier of said mobile equipment as constituted by its IMEI code.

12. The authentication system according to claim 9, wherein the system further comprises means for creating a digital audio file on the basis of said digital code, said digital audio file being adapted to run automatically on the terminal to generate said sound signal.

13. The authentication system according to claim 9, wherein the system further comprises:
means for sampling said sound signal; and
identification means suitable for comparing the result of said sampling with a copy of said digital code stored by said authentication unit.

14. The authentication system according to claim 13, wherein the system further comprises means for sending an SMS to said mobile equipment, said SMS comprising the date and the result obtained by the identification means.

15. An authentication system according to claim 9, wherein said sound signal is a DTMF code sequence.

16. The authentication system according to claim 9, wherein the system further comprises:
means for randomly generating said digital code; and
destruction means adapted to destroy said digital code on receiving an order from said identification means or after a predetermined time period has elapsed.

* * * * *